United States Patent [19]

Baukal et al.

[11] 4,038,464  
[45] July 26, 1977

[54] SODIUM-SULFUR BATTERY AND PROCESS FOR ITS PRODUCTION

[76] Inventors: Werner Baukal, Ringstrasse 1, 6242 Kronberg; Reinhard Knodler, Vorstadt 27, 6239 Diedenbergen; Wolfgang Hermann Kuhn, Oberhochstadter Weg 13, 6 Frankfurt am Main, all of Germany

[21] Appl. No.: 635,657

[22] Filed: Nov. 26, 1975

[30] Foreign Application Priority Data

Nov. 27, 1974 Germany .............................. 2456018
Nov. 27, 1974 Germany .............................. 2456021

[51] Int. Cl.² ........................................ H01M 10/04
[52] U.S. Cl. ................................................ 429/104
[58] Field of Search ............. 136/6 FS, 6 F, 20, 83 R, 136/100 R, 153, 6 B; 429/104, 191

[56] References Cited

U.S. PATENT DOCUMENTS

| | | |
|---|---|---|
| 3,915,741 | 10/1975 | Kogiso et al. ..................... 136/6 FS |
| 3,922,176 | 11/1975 | Robinson et al. .................. 136/6 FS |
| 3,932,195 | 1/1976 | Evans et al. ........................ 136/6 FS |

Primary Examiner—Anthony Skapars  
Attorney, Agent, or Firm—Fisher, Christen & Sabol

[57] ABSTRACT

A rechargeable galvanic battery which contains liquid sodium, as the negative electro-chemically active material, and liquid sulfur, as the positive electro-chemically active material, and a ceramic solid electrolyte, which is capable of conducting sodium ions. The sodium is completely absorbed in a fine-pored metal felt or mat. The sulfur is completely absorbed in a graphite felt or mat. The metal felt has open pores which face toward the solid electrolyte. The pore structure of the metal felt is undisturbed even in the transition area between the metal felt and the solid electrolyte. The metal felt fills the entire anode space of the battery. At least at the operating temperature of the battery, an intimate contact over a large surface area exists between the metal felt and the solid electrolyte. The maximum distance between the metal felt and the solid electrolyte is in the order of the magnitude of the pore width of the metal felt.

7 Claims, 2 Drawing Figures

SODIUM-SULFUR BATTERY AND PROCESS FOR ITS PRODUCTION

BACKGROUND OF THE INVENTION

1. Field of This Invention

This invention relates to a rechargeable galvanic battery and especially to processes for its production. This is a battery with liquid sodium as the negative and liquid sulfur as the positive, electro-chemically active material, as well as with a ceramic solid electrolyte capable of conducting sodium ions; the sodium, in the case of this battery, is completely absorbed in a finely pored metal mat (felt) which fills the entire anode space.

2. Prior Art

Sodium-sulfur batteries having ceramic solid electrolytes, which are capable of conducting sodium ions, have been known for years [see, for example: *J. T. Kummer and N. Weber*, Autom. Eng. Congr. Detroit, S.A.E., (1967), page 670, 179; and *Fally, Lasne and Lazennec*, J. Electrochem. Soc. (1973), p. 1292]. In the case of the hitherto described constructions, which have been examined in more detail, the sodium usually is in the inside of a small tube consisting of the solid electrolyte, namely, $\beta - Al_2O_3$, which is surrounded by melted sulfur or sodium polysulfide, absorbed in a graphite matrix. In such batteries, the reaction of sulfur or sodium polysulfide with sodium to yield a sodium sulfide having a lower sulfur content is used for the production of an electric current. (In the following text sodium polysulfide having a high sulfur content, is also referred to and included in the term "sulfur".) The operating temperature of such cells or batteries as a rule are about 300° C.

Several small tubes of solid electrolyte, in such a case, can be disposed in a common housing, which is filled with graphite felt and sulfur — while the small open tubes lead to a common sodium supply vessel. In this way, a whole group of individual galvanic cells can be combined electrically in parallel connection; the housing which is in contact with the sulfur also serves as collector of the current.

It is also known, inversely, to bring up the sulfur electrode from inside and the sodium from outside to the same solid electrolyte tubes. In the case of such a design, the aggressive (active) sulfur melt does not come into contact with the housing material; also, the metallically-conductive sodium content leads to an even distribution of current between the housing and the individual cells, which is not quite guaranteed in the case of the sulfur electrode.

In the case of the above described arrangement of sulfur-filled small solid electrode tubes in a container with sodium it is necessary to absorb the sodium supply in a matrix of, for example, iron felt (mat) (see German appln. Nos. 1,771,029 and 2,401,726). This measure fulfills a double purpose; for one thing, any escape of liquid sodium in the case of damage to the battery housing, and any danger caused thereby, is prevented; secondly, the capillary system leads to the fact that the entire electrolyte surface remains covered with sodium in any charging state of the cell or battery, so the electric current density will be almost equally high everywhere; (otherwise the solid electrolyte would be, on a point by point bases, loaded with too high a current density, which would cause changes leading destruction of the solid electrolyte after a short period of time).

A uniform current load of the solid electrolyte, however, will appear only whenever care is taken to achieve uniform contact between sodium and electrolyte. In order to achieve this it is known to adjust (set) a definite narrow gap between the metal felt and the electrolyte by special measures (see DT-OS No. 2,401,726 and DT-OS No. 2,400,202. Such so-called distribution mechanisms for the liquid sodium along one wall of the small electrolyte tube have, however, the disadvantage that they will fulfill the desired purpose only up to a certain discharge; in order to avoid damage, it is therefore necessary in the case of such a battery that a relatively high minimum charge, and thus a minimum quantity of sodium, be maintained in the anode space (although for economic reasons, one should strive for a battery with as low as possible a discharge capacity, without danger of damage to the solid electrolyte).

In addition, the production of such known batteries, respectively of a definite narrow gap on the wall of the solid electrolyte in the anode space causes considerable difficulties, because as a result of the customary processing, such as drilling, milling or stamping or even only as a result of too high pressure, the pore structure of the metal felt will be influenced disadvantageously, at least in the transition area toward the solid electrolyte. The pores in the metal felt are indeed either crushed or plugged up by such processing methods and thus the pore structure of the fine-pored metal felt, which is essential for the functioning, will be destroyed thereby. The discharge capacity, the specific energy, the useful life of the battery or other characteristics are considerably impaired in this way.

BROAD DESCRIPTION OF THIS INVENTION

An object of this invention is to provide a battery which does not possess the previously described disadvantages of known sodium-sulfur batteries. Another object of this invention is to provide a battery which is distinguished by a deep discharge capacity, a relatively high structural density, a high specific energy (related to the weight or the volume of such battery) and a comparatively slight internal resistance. A further object of this invention is to provide a simple and economic process for producing such battery. Other objects and advantages of this invention are set forth herein or are obvious herefrom to one ordinarily skilled in the art.

The battery and process of this invention achieves the objects and advantages of this invention.

This invention achieves these objects and tasks in a very progressive technical manner by means of a battery of the initially described kind, which has the characteristics that the metal felt or mat has open pores facing toward the solid electrolyte, that the pore structure of the metal felt is largely undisturbed even in the transition area between the metal felt and the solid electrolyte, and that, at least at the operating temperatures of the battery, intimate contact over a large area exists between the metal felt and the solid electrolyte. The desired structure of the metal felt in the transition area toward the solid electrolyte can be achieved preferably, according to this invention, by spark-erosion processing methods.

This invention involves a rechargeable galvanic battery which is comprised of liquid sodium, as the negative electrochemically active material, and liquid sulfur, as the positive electro-chemically active material, and a ceramic solid electrolyte, which is capable of conducting sodium ions. The sodium is completely absorbed in a finely pored metal felt or mat. The sulfur is completely absorbed in a graphite felt or mat. The metal felt has open pores which face toward the solid electrolyte. The pore structure of the metal felt is undisturbed even in the transition area between the metal felt and the solid electrolyte. The metal felt fills the entire anode space of the battery. At least at the operating temperature of the battery, an intimate contact over a large surface area exists between the metal felt and the solid electrolyte. The maximum distance between the metal felt and the solid electrolyte is in the order of the magnitude of the pore width of the metal felt.

Preferably the metal felt has been formed and processed by spark-erosion, at least on the side of the metal felt facing the solid electrolyte. Preferably the metal felt in the anode space has a porosity of more than 80 volume percent and has an average pore width of 20 to 500 $\mu$m. More preferably the metal felt in the anode space has a porosity of more than 90 volume percent and has an average pore width of 20 to 100 $\mu$m. Preferably the solid electrolyte is in the form of several containers, which are open on the side on which the sulfur absorbed by the graphite felt is located and which are disposed in a common sodium anode space. Preferably metal felt in the battery housing has a variable pore width whereby the metal felt in the area of the container walls is more finely pored than the metal felt in the remaining anode space. Preferably the more finely pored metal felt has an average pore width of between 20 and 100 $\mu$m and the more coarsely pored metal felt has an average pore width between 30 and 300 $\mu$m.

This invention also includes a process for the production of a rechargeable galvanic battery, which has liquid sodium as a negative electro-chemically active material, liquid sulfur as a positive electro-chemically acting material and a ceramic solid electrolyte which is capable of conducting sodium ions. The sodium is completely absorbed in a fine-pored metal felt or mat, which fills the entire anode space of the battery. The side of the metal felt facing the solid electrolyte is developed and processed in such a way that the pore structure of the metal felt, even in the transition area between the metal felt and the solid electrolyte, remains intact, so that the pores are open toward the solid electrolyte, and so that intimate contact exists over a large surface area between the metal felt and the solid electrolyte. As a result thereof, at least at the operating temperature of the battery, the maximum distance between the metal felt and the solid electrolyte is in the order of magnitude of the pore width of the metal felt. Preferably the side of the metal felt facing the solid electrolyte is formed by means of the spark-erosion process and is adapted to the surface of the solid electrolyte.

Whenever the sulfur is inside the small solid electrolyte tube and the sodium is in the outside space, than holes can be drilled into the metal felt at a very high degree of precision by the process of spark-erosion known per se, into which holes the small electrolyte tubes can then be inserted. In the case of this method of production, the pore structure — as required — is completely preserved even on the side facing the solid electrolyte, so that open pores are formed toward the solid electrolyte, although after insertion of the small tubes into the perfectly adapted apertures an intimate contact over a large area develops between the metal felt and the solid electrolyte (at least at the operating temperature of the battery). In case of use of the customary treatment processes, such as drilling, stamping, etc., for the production of holes of precise dimensions in a metal felt, the pore structure in the transition area would be affected unfavorably, with the result that the sodium discharge from the anode space would be rendered difficult — to prevent some damage to the solid electrolyte, a relatively high minimum charge would therefore have to be maintained.

In the case of operation of the battery of this invention it turned out that the internal resistance of the cell or the battery took a characteristic course. While in the case of cells of the known kind, i.e., cells with a defined gap between the metal felt and the electrolyte surface, or with poorly fitted felt, the resistance just prior to complete discharge rises sharply. In the case of the battery of this invention the end of the discharge is announced beginning with about the 80 percent discharge point by a slowly starting increase in resistance. Therefore, in case of the battery of this invention this increase in resistance — which means an additional important advantage of the invention — such can very easily be used for the regulation respectively of charge-control. Whereas in the case of the known batteries the range of increasing resistance must be avoided because of the danger of damage to the cells.

DETAILED DESCRIPTION OF THIS INVENTION

Further characteristics, advantages and features of this invention are evident from the following description of this invention.

Figure 1:
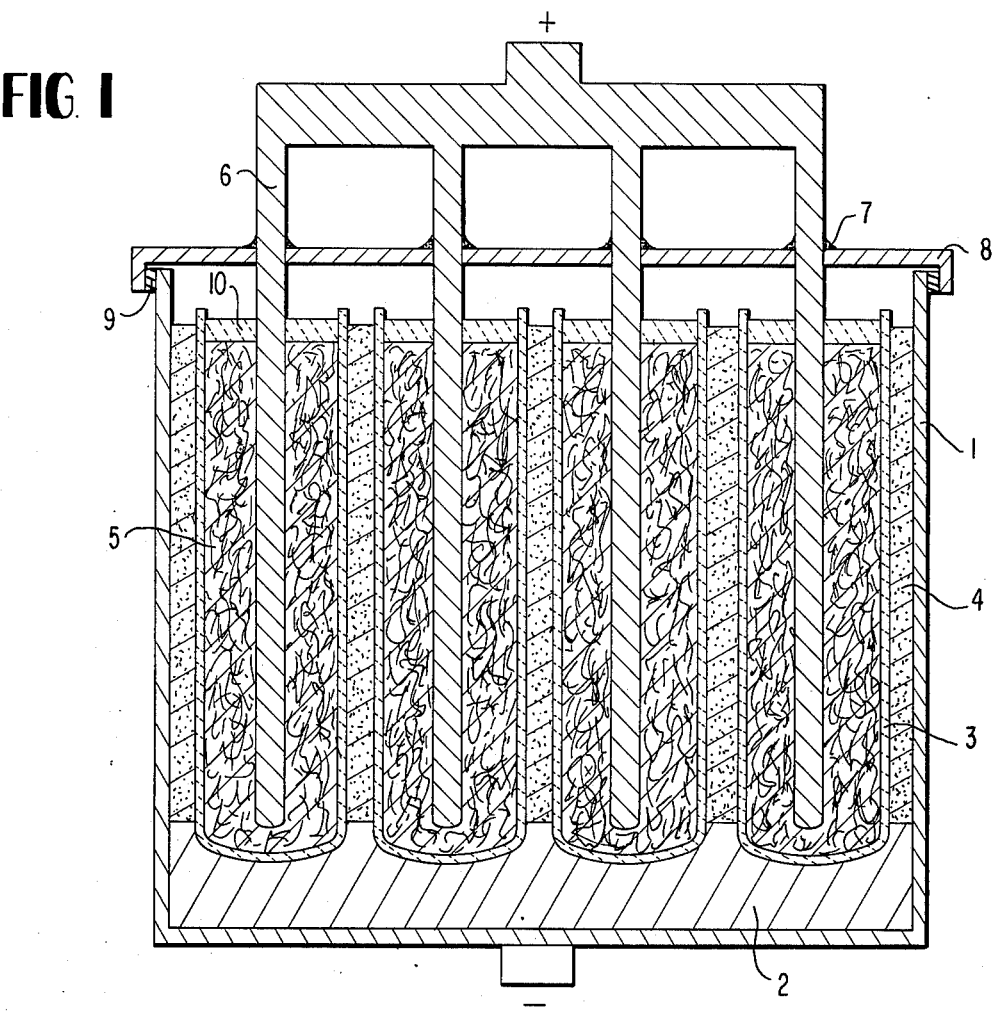
FIG. 1 is a sche-cross-sectional view of a battery of this invention.

According to the embodiment of this invention shown in FIG. 1, the battery consists of housing 1, which, just like lid 8, is made of steel. Some other material, which is sodium, can also be used for both parts. Gaskets 7, 9, 10 are preferably made of glass or they can be constructed of graphite. Small tubes closed on the bottom form a ceramic solid electrolyte, in this case made of $\beta-Al_2O_3$, such being capable of conducting sodium ions, and serve as containers 3 for the melted sulfur absorbed in graphite felt 5. The sulfur had been absorbed in graphite felt 5 in the inside of containers 3, which have the shape of small tubes. Graphite bar 6 is stuck into graphite felt 5. Graphite bar 6 serves as a conductor for the current. The individual graphite bars of the various cells come out through apertures of lid 8 provided with gaskets 7. These passages (ducts) must be electrically insulating, unless gasket 9 accomplishes the insulation.

The space in housing 1 between container 3, shaped in the form of small tubes, and the outside housing wall, is completely filled with a fine-pored felt 4 made of steel, which on its part is completely saturated with the electro-chemically active sodium. The mean pore size in steel felt 4 is preferably about 50 $\mu$m. The remaining anode space, that is, sodium space in housing 1, is filled with a somewhat more coarse steel felt 2, the average pore size of which is about 100 $\mu$m. In housing 1, there is thus a common reservoir of immobilized sodium, which thus is secured against escaping (flowing out) from each of the individual cells of the battery, according to this invention.

The contact between fine-pored metal felt 4 and the outside wall of small solid electrolyte tube 3 must be, according to this invention, as intimate as possible (at least at the operating temperature) without any disadvantage or impairment of the pore structure. This is achieved by the production method of this invention, and by adaptation of steel felt 4. The contact is assisted also by the expansion of the metal felt which occurs during heating of the battery to the operating temperature.

Figure 2:
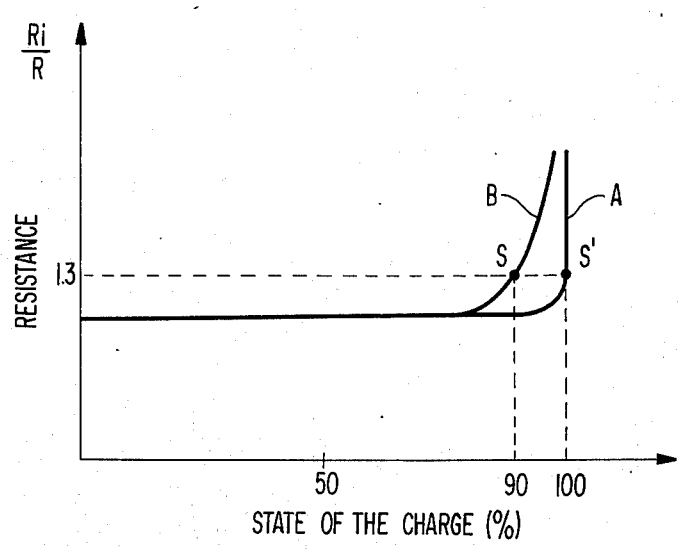
FIG. 2 is a diagram of the internal resistance of a known sodium-sulfur cell and of one according to this invention, in dependence on the state of the charge.

The diagram according to FIG. 2 serves for the clarification of the already mentioned course of the internal resistance of the battery according to this inventon. Discharge curve A is valid for a customary sodium-sulfur cell, in the anode space of which the metal felt is only insufficiently adapted to the assigned solid electrolyte surface. On the contrary, curve B shows the dependence of the internal resistance $R_j$ on the condition of the charge in case of a battery or cell with the adaption and development of the transition area between the metal felt and the solid electrolyte required in accordance with this invention. The curves were plotted during removal of a constant current.

In the case of the cell, having the characteristic line B, (shown in FIG. 2) and built according to this invention, a distinct signal which can be utilized simply — for change over or turning off of the cell — can be deduced contrary to a cell with the characteristic line A, at about 90 percent discharge by the clear rise in resistance or drop in voltage. Without any danger of damage of the individual cells and above all the sensitive electrolyte ceramic, one can achieve a method of operation with (cyclic) discharge up to about 90 to 95 percent using this invention.

In this application, all parts, ratios, proportions and percentages are on a weight basis, unless otherwise stated or otherwise obvious to one ordinarily skilled in the art. The following examples serve as a more detailed explanation of the method of operation and of the production of batteries of the type according to this invention.

EXAMPLE 1

For the production of a galvanic cell according to this invention, small tubes closed on one side, made of $\beta$—$Al_2O_3$, having an 10.0 mm outside diameter and of about 100 mm in length were used as an electrolyte; the thickness of the wall was about 0.5 mm. A pipe made of steel, and having a 20 mm diameter, was provided as a housing. The small electrolyte tube was filled with graphite felt, was provided with a perforated lid made of sintered corundum and was saturated with melted sodium-sulfide $NaS_2$ using the hole in the lid. The hole in the lid was closed by a graphite bar (rod); the perforation and the edge of the lid was sealed with a glass melt. Into the steel pipe, closed on one side, two disks made of steel felt (mat) were inserted which, corresponding to the inside diameter of the pipe, had been punched out from a felt disk of 5 mm thickness. The steel felt had a mean pore width of about 80 $\mu$m and had about 90 volume percent porosity.

Eight additional disks with the same diameter were punched out from a steel felt (mat), and each had an average pore width of 35 $\mu$m and a 10 mm thickness. The eight additional disks were subjected to processing according to this invention. In an apparatus for spark-erosion (Nassovia-Krupp FE 6A), circular concentric holes having a diameter of 10.00±0.05 mm were burnt into disks, while rinsing vigrously with crude oil (petroleum). A cylindrical electrode with an outside diameter of 9.90 mm served for this purpose. At a voltage of about 100V and at corresponding slight material consumption. A surface was produced having a low roughness which upon observation in the microscope did not differ from the section of a felt embedded in synthetic resin, which shows that the pore structure had not been disturbed by the processing. The disk could easily be pushed with a slight frictional resistance, onto the small ceramic tubes.

The eight disks were set onto the small tubes and were saturated with melted sodium (with the exclusion of air). The steel pipe was closed with a perforated screw lid using graphite gasket and with the interposition of an iron spacer in such a way that the iron felt packing was compressed with a slight pressure and the graphite bar projected from the lid bore as a conductor of current. The space between the graphite bar and the lid bore was sealed with a temperature-resistant cement while using a ceramic ring.

Such sealed compartments were filled with variable quantities of sodium for the purpose of experimentation. Whenver the sodium quantity was smaller than the stoichiometric equivalent of the sulfide filling, then again the characteristic course of the characteristic lines for resistance aleady described on the basis of FIG. 2, showed up. In the case of cells with a poorly fitted felt, the resistance rose promptly (in sudden bursts). Whenever a certain sodium quantity is consumed and the rest loses its contact with the small electrolyte tube, even in the presence of the felt treated according to this invention, a rise in resistance shows up beginning with about 90 percent discharge in good time in order to indicate that further discharge must not take place, so that the electrolyte will not be destroyed.

EXAMPLE 2

The process shows its complete advantages during production of modules made from cells connected in parallel (for example, in this respect FIG. 1). If several small electrolyte tubes 3 are enclosed in a common housing 1 filled with sodium, then the volume of the inside spaces of the small tubes [therefore the quantity of sulfur or sulfide 5 ] must correspond approximately to the volume of the intervals [sodium quantity 4 ], so that the active materials can be fully made use of. This will be the case only, whenever the small tubes are disposed at a slight distance from one another and from the housing wall. For example, small tubes of a 10 mm inside diameter sould be arranged in a housing of square (even better hexagonal) cross-section in such a way, that they have at most a distance of 2 mm from one another and from the walls. Such a form of the steel felt cannot be achieved at all with any other processing methods except with spark erosion — the 2 mm bridges would be torn out or (in case of punching) would be completely squashed. In this case, the holes were burnt with the same electrode as in Example 1 through a stack of 8 felt disks. In this case too, the fit was such that the small electrolyte tubes could be inserted into the holes with friction. An hexagonal battery with 7 small electrolyte tubes of the dimensions mentioned in Example 1 was discharged without a change in resistance up to 90 percent of the predetermined sodium; then the resistance rose slowly.

The advantages and special characteristics of the battery according to this invention, and of the method of production, are realized whenever the metal felt and the sodium absorbed by said felt — contrary to the battery depicted in FIG. 1 and described — are disposed in the inside of the small solid electrolyte tubes. No further detailed explanation of such a type of embodiment is needed because this type, as expected, is equivalent to the battery described.

What is claimed is:

1. A rechargeable galvanic battery which is comprised of liquid sodium, as the negative electro-chemically active material, liquid sulfur, as the positive electro-chemically active material, and a ceramic solid electrolyte, which is capable of conducting sodium ions, said sodium being completely absorbed in a fine-pored metal felt or mat and said sulfur being completely absorbed in a graphite felt or mat, said metal felt having open pores which face toward said solid electrolyte, the pore structure of said metal felt being undisturbed even in the transition area between said metal felt and said solid electrolyte, said metal felt filling the entire anode space of said battery, and, at least at the operating temperature of said battery, an intimate contact over a large surface area existing between said metal felt and said solid electrolyte and the maximum distance between said metal felt and said solid electrolyte being in the order of the magnitude of said pore width of said metal felt.

2. A battery as described in claim 1 wherein said metal felt has been formed and processed by spark-erosion, at least on the side of said metal felt facing said solid electrolyte.

3. A battery as described in claim 2 wherein said metal felt in the anode space has a porosity of more than 80 volume percent and has an average pore width of 20 to 500 $\mu$m.

4. A battery described in claim 2 wherein said metal felt in the anode space has a porosity of more than 90 volume percent and has an average pore width of 20 to 100$\mu$m.

5. A battery as described in claim 1 wherein said solid electrolyte is in the form of several containers, which are open on the side on which said sulfur absorbed by said graphite felt is located and which are disposed in a common sodium anode space.

6. A battery as described in claim 1 wherein said metal felt in said battery housing has a variable pore width whereby said metal felt in the area of said container walls is more finely pored than said metal felt in the remaining anode space.

7. A battery as described in claim 6 wherein said more finely-pored metal felt has an average pore width of between 20 and 100 $\mu$m and said more coarsely-pored metal felt has an average pore width between 30 and 300 $\mu$m.

* * * * *